(12) United States Patent
Qayyum et al.

(10) Patent No.: US 8,458,178 B2
(45) Date of Patent: *Jun. 4, 2013

(54) DIMENSIONAL DATA EXPLORER

(75) Inventors: Kashif Qayyum, Fremont, CA (US);
Jon Ruggiero, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/329,544

(22) Filed: Dec. 19, 2011

(65) Prior Publication Data

US 2012/0089636 A1    Apr. 12, 2012

Related U.S. Application Data

(63) Continuation of application No. 12/077,086, filed on Mar. 14, 2008, now Pat. No. 8,145,635.

(51) Int. Cl.
*G06F 17/30*    (2006.01)

(52) U.S. Cl.
USPC .......................................... 707/736; 707/769

(58) Field of Classification Search
USPC .................................................. 707/736, 769
See application file for complete search history.

(56) References Cited

U.S. PATENT DOCUMENTS

| | | | | |
|---|---|---|---|---|
| 5,511,190 | A * | 4/1996 | Sharma et al. | ........................ 1/1 |
| 6,212,524 | B1 * | 4/2001 | Weissman et al. | ............. 707/600 |
| 6,460,031 | B1 * | 10/2002 | Wilson et al. | .................. 707/769 |
| 6,539,396 | B1 * | 3/2003 | Bowman-Amuah | .......... 707/769 |
| 7,110,997 | B1 * | 9/2006 | Turkel et al. | ................... 707/713 |
| 7,333,982 | B2 * | 2/2008 | Bakalash et al. | .............. 707/600 |

* cited by examiner

*Primary Examiner* — Kim Nguyen
(74) *Attorney, Agent, or Firm* — Van Pelt, Yi & James LLP

(57) ABSTRACT

A dimensional data explorer for an enterprise system is disclosed. Dimensional data exploration includes providing a list of dimensions by which aggregated data in a report can be disaggregated and reaggregated. Aggregated data comprises a set of measures that have been aggregated for each object of a set of objects. Dimensional data exploration further includes providing the aggregated data disaggregated and reaggregated using a dimension from the list of dimensions.

14 Claims, 9 Drawing Sheets

DIMENSIONAL DATA EXPLORER

CROSS REFERENCE TO OTHER APPLICATIONS

This application is a continuation of co-pending U.S. patent application Ser. No. 12/077,086, entitled DIMENSIONAL DATA EXPLORER filed Mar. 14, 2008 which is incorporated herein by reference for all purposes.

BACKGROUND OF THE INVENTION

Human capital management (HCM) systems or human resource (HR) systems help organizations manage human resources. Traditionally, these systems are optimized for producing extensive reports, for instance for accounting or for end-of-year reporting purposes. Extensive reports of this form are necessary, but are not useful for assisting managers in day-to-day decision-making. If a manager wants to know a piece of aggregate information, for example the average salary of his group or number of workers at a given location, he must download the tables of information into on offline data analysis program and manually extract the desired pieces of information. This is time-consuming, requires expertise on the part of the user, and requires the data to be taken off-line, creating the possibility that it will become out of date as the user is examining it. Additionally, if a user is interested in exploring related pieces of information in the database, for example going from an employee to his manager to her work location, contact information, and other employees reporting to her, the user must manually search from one piece of data to the next in the tables.

BRIEF DESCRIPTION OF THE DRAWINGS

Various embodiments of the invention are disclosed in the following detailed description and the accompanying drawings.

DETAILED DESCRIPTION

Figure 1:
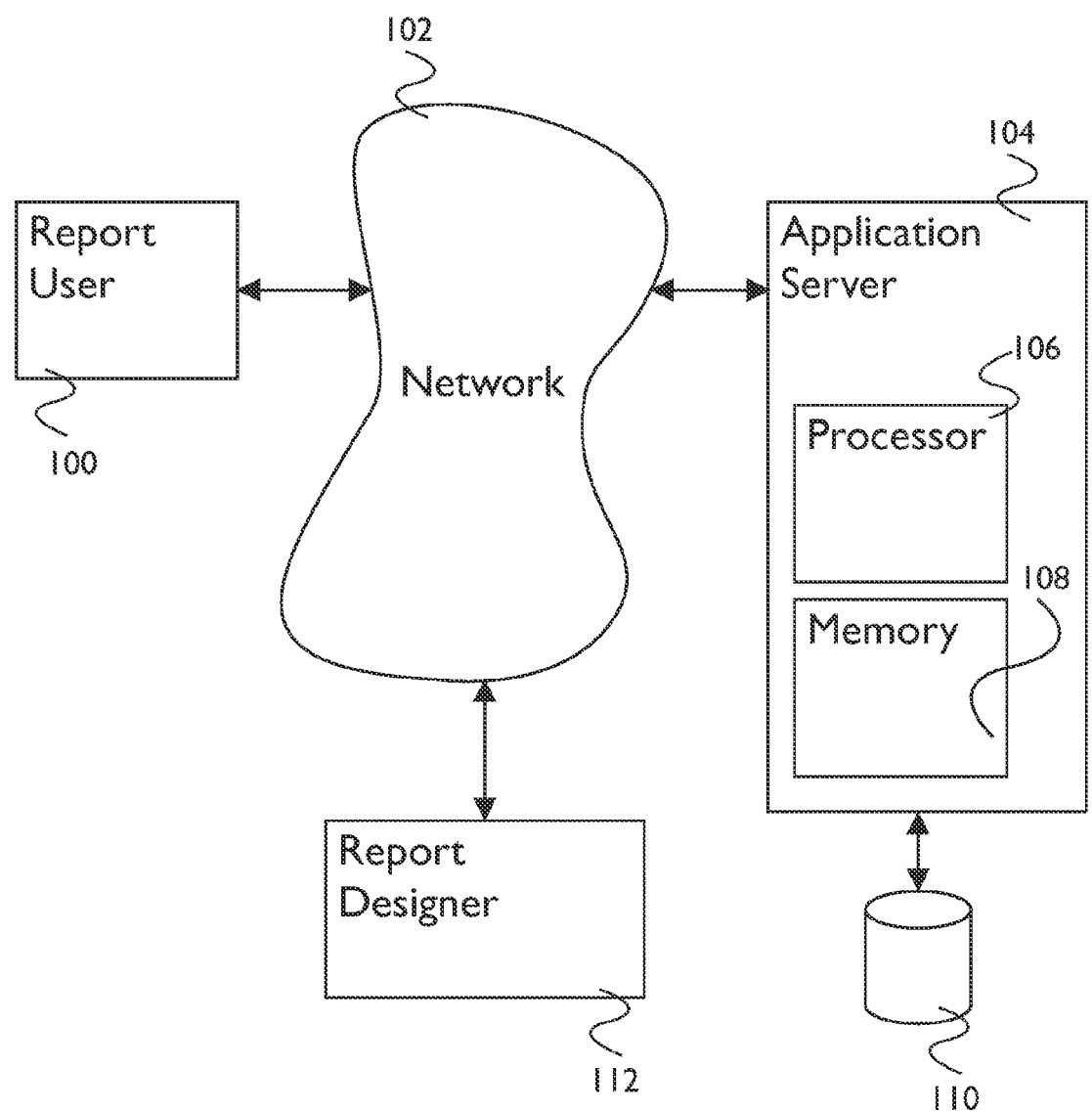
FIG. 1 is a block diagram illustrating an embodiment of a system for data storage and reporting.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A dimensional data explorer for an enterprise system is disclosed. In various embodiments, an enterprise system comprises a human resource system, payroll system, financial system, supply chain management system, customer relation management system, content management system, business system, or any other appropriate enterprise system. A report can display all business data. However, a more manageable display aggregates data for understandability. For example, it is easier to grasp a company with 1024 employees rather than a list of each of the 1024 employee names. Even further, it is useful to be able to analyze the aggregated data with regard to other dimensions for that data. For example, for the 1024 employees, displaying the number of employees at each of the business location sites (e.g., 724 at Palo Alto site, 275 at the San Francisco site, and 25 at the Santa Cruz site).

Business data is stored in the enterprise system in a set of instances of business classes. A class comprises data attributes, relations to other classes, and methods for operating on the attributes and relations. A class is enabled for participation in dimensional data exploration by designating some of its methods as having special functions used in the data exploration process. Some of the methods are designated as class report fields, indicating they report data suitable to be placed in the column of a report (e.g., employees in a department, employee salary, etc.). Some of the class report fields are designated as measures, indicating that they can be used to convert an object instance (e.g., an object instance representing an employee) into a number (e.g., salary, years of experience) which is or can be aggregated. Some of the class report fields are designated as dimensions, indicating they can be used to reaggregate data in a report (e.g. the 1024 total company employees are disaggregated and then reaggregated by business location site). Some methods are designated as report data sources, indicating they report a set of objects suitable for each row of a report (e.g., business location sites, departments, etc.).

A report is built by a report creator and then run by a report user. A report creator builds a report by first by creating an empty report and specifying a report data source for the report. The report creator then defines a new report column by specifying a class report field for the column. The class report field generates either an attribute or a set of object instances for each row. If the class report field generates a set of object instances, the report creator chooses a measure of the object instance and an aggregation function to combine the numbers returned by the measure. The report creator designs as many columns as desired in this way.

When the report user runs the report, the report data source is executed and returns a set of instances. Each instance is assigned to one row in the report. The class report field chosen by the report creator for each column is executed for the object instance in each row generating a table of either attributes or object instance sets. Instance sets are aggregated using measures and aggregation functions specified by the report creator. The aggregated data is entered in the report. Wherever an entry in the report has been produced by aggregation, a data exploration button appears in the report next to the entry. If the report user wants to explore the aggregated data along a different dimension, the user selects the data exploration button and presented with a list of the class report fields that have been designated as dimensions. The report user then selects one of the dimensions and is presented with a subreport that shows the data which has been disaggregated and then reaggregated using that dimensions. If the user wishes to continue exploring, the user can continue producing more specific subreports by repeating the process of selecting a data exploration button and a dimension.

FIG. 1 is a block diagram illustrating an embodiment of a system for data storage and reporting. In the example shown, application server 104 includes processor 106 and memory 108. Application server 104 is coupled to external storage 110 so that application server 104 is able to store information to and access information from external storage 110. Application server 104 is also coupled to network 102. In various embodiments, network 102 comprises one or more of the following: a local area network, a wide area network, a wired network, a wireless network, the Internet, or any other appropriate network. Network 102 enables report user 100 and report designer 112 to access application server 104. In various embodiments, report designer 112 specifies an application that runs on application server 104, and user 100 accesses that application. The application prepares reports based on stored data. In various embodiments, stored data is related to a business requirement such as an expense report, a personnel file, data related to an employee, or any other relevant data. In various embodiments, the application comprises an enterprise application, a human resources application, a business process application, a finance application, a content management application, or any other appropriate application for which a dimensional data explorer is useful.

Figure 2:
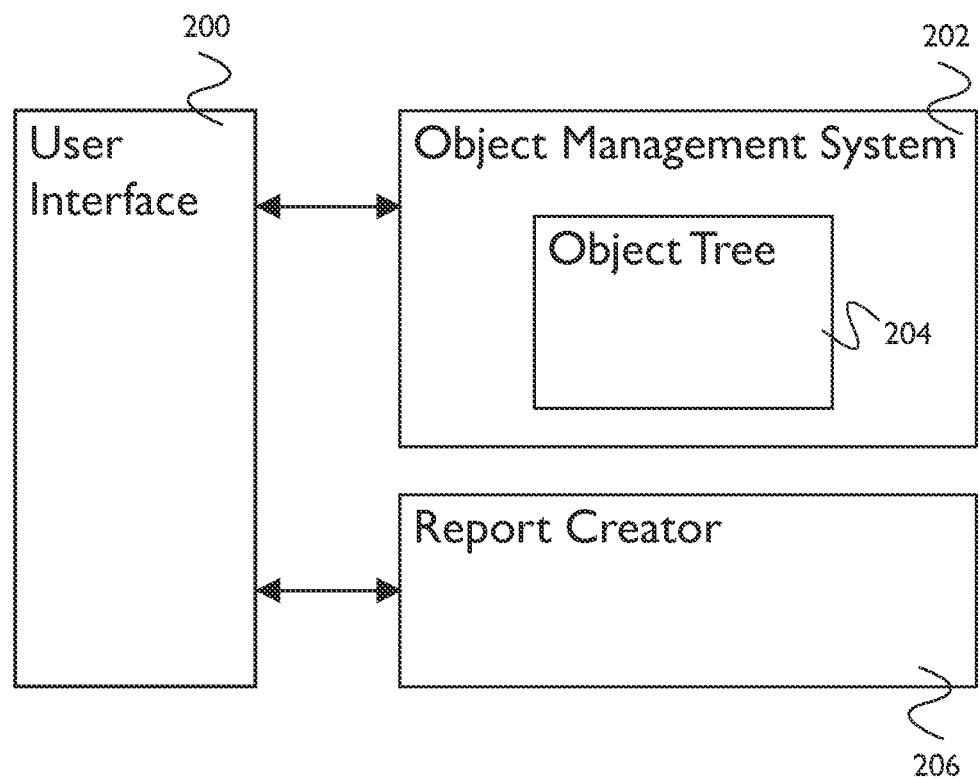
FIG. 2 is a block diagram illustrating an embodiment of a system for reporting and data exploration.

FIG. 2 is a block diagram illustrating an embodiment of a system for reporting and data exploration. In the example shown, a database user (e.g., a user such as report user 100 of FIG. 1) interacts with user interface 200, providing input to and receiving output from an application server. Object management system 202 is part of an application running on an application server (e.g., an application server such as application server 104 of FIG. 1). User interface 200 communicates with object management system 202 through a network (e.g., a network such as network 102 of FIG. 1). In various embodiments, object management system 202 makes additions and/or changes to stored data, tracks additions and/or changes to stored data, and/or prepares reports based on stored data. In the example shown, stored data is stored in object tree structure 204 within object management system 202. In the example shown, the capabilities of object management system 202 include reporting.

In the example shown, the system includes report creator 206. Report creator 206 is an application running on an application server (e.g. application server 104 of FIG. 1). In some embodiments, the report creator is not a separate application as indicated in FIG. 2, but is a part of the OMS leveraging access to all the structure in the object tree. A report designer (e.g. report designer 112 of FIG. 1) interacts with interface 200 to access report creator 206 and create a new report. In some embodiments, the report enables data exploration.

Figure 3:
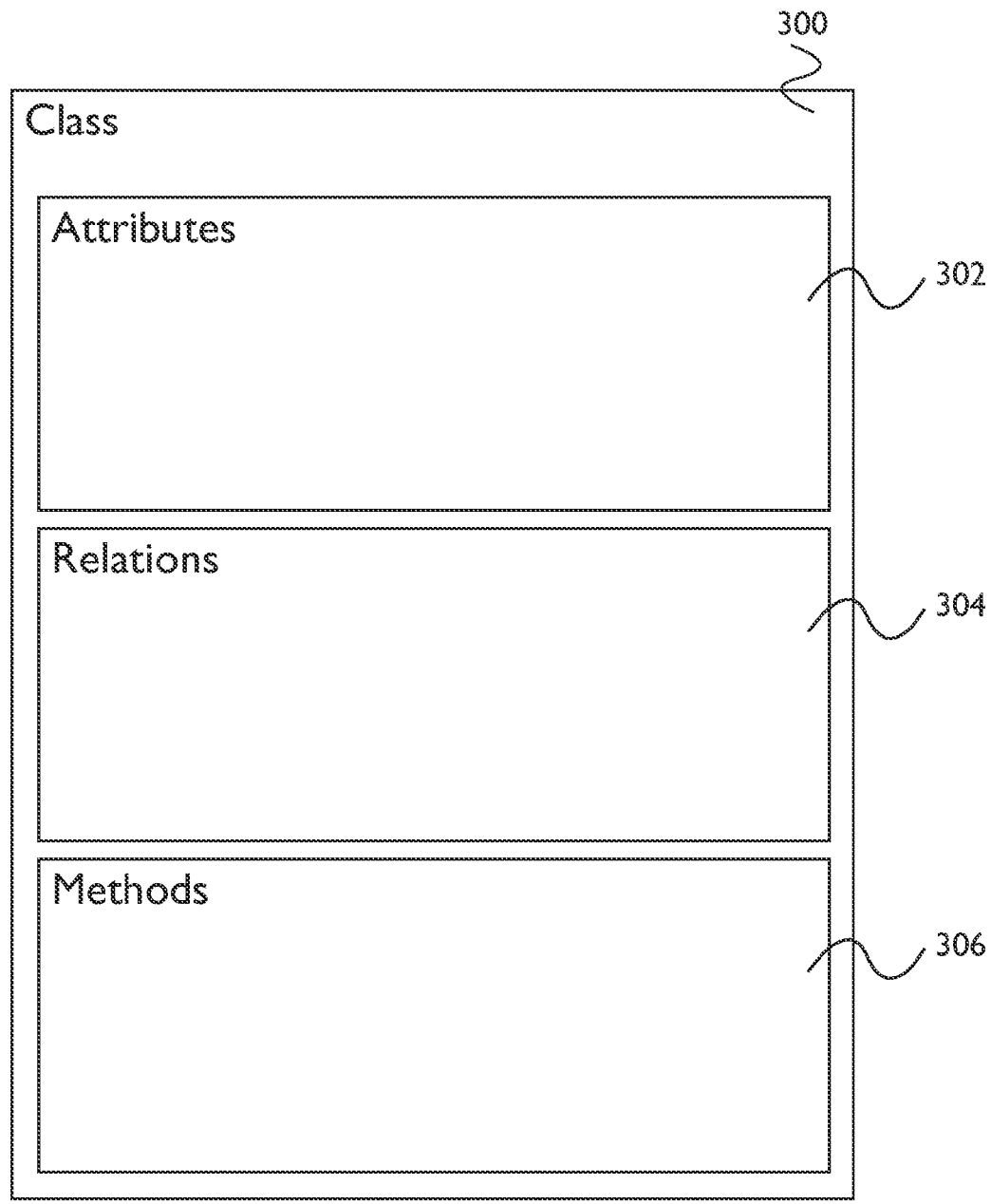
FIG. 3 is a block diagram illustrating an embodiment of a class data structure.

FIG. 3 is a block diagram illustrating an embodiment of a class data structure. In some embodiments, stored data, such as object tree data associated with object tree 204 of FIG. 2, is stored in class data structures of FIG. 3. In the example shown, class 300 is comprised of zero, one, or more than one attributes 302, zero, one, or more than one relations 304, and zero, one, or more than one methods 306. Attributes 302 store data about the class, for instance, name, location, salary, title, or any other human resource, corporate, financial, legal, or medical data, or any other appropriate data. Relations 304 store relations between a given object instance of class 300 and other object instances of the class or of other class definitions. Methods 306 define operations that can be performed with the attributes and relations. A given class definition has a certain set of attributes and relations, as well as a certain set of methods used to operate on those attributes and relations. A given object instance of a class definition has defined values for each of the attributes and relations.

Figure 4:
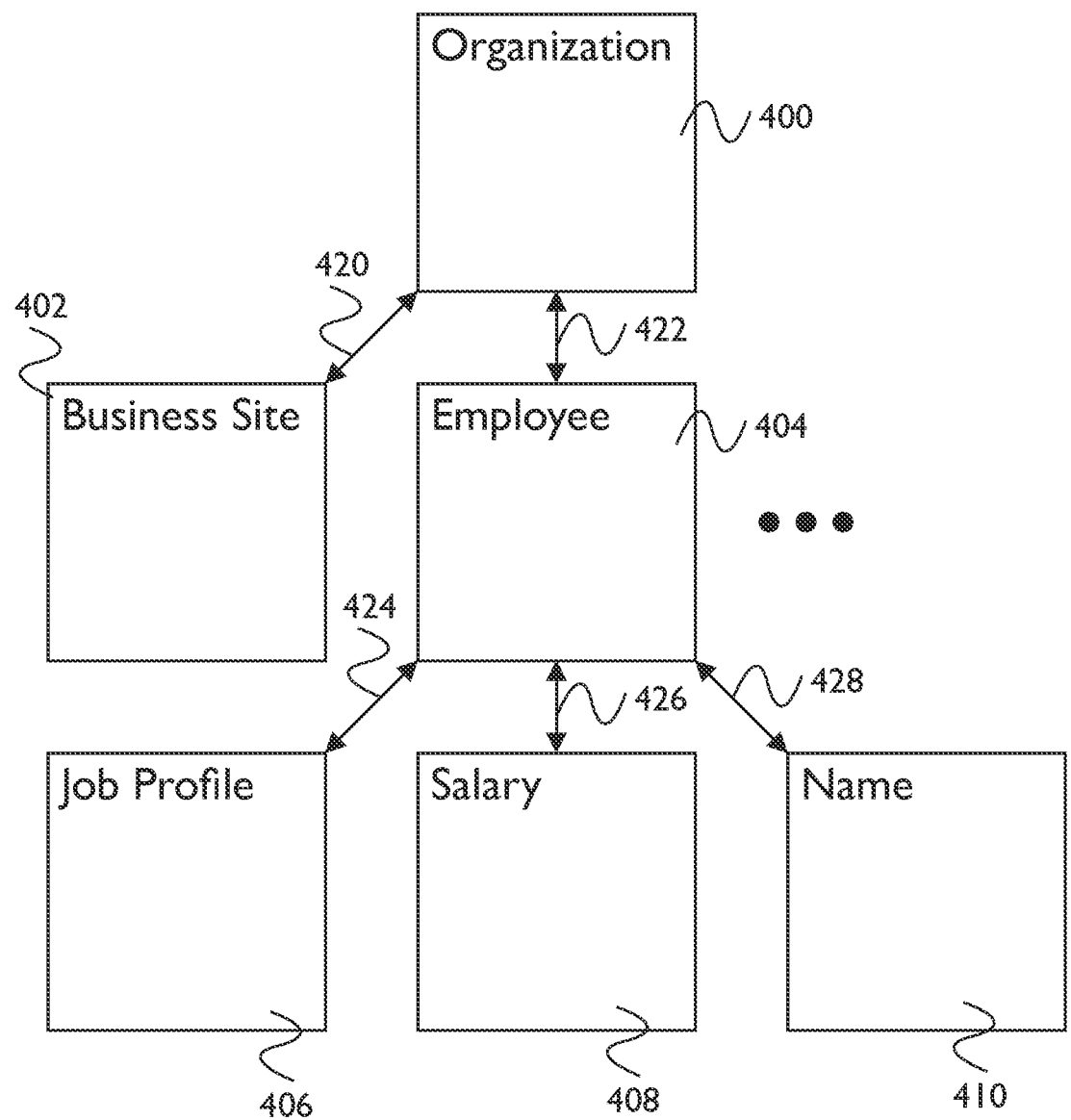
FIG. 4 is a block diagram illustrating an embodiment of a data structure for an object tree.

FIG. 4 is a block diagram illustrating an embodiment of a data structure for an object tree. In some embodiments, the object tree of FIG. 4 may be used to implement object tree 204 of FIG. 2. In some embodiments, objects 400, 402, 404, 406, 408, and 410 comprise object data structures as shown in FIG. 3. In some embodiments, relations 420, 422, 424, 426, and 428 comprise relations referred to in FIG. 3. In the example shown, objects represented in FIG. 4 represent a part of a business data structure. Organization 400 has relation 420 to business site object 402. Business site object 402 contains the name of the site at which the organization resides. Organization 400 also has relation 422 to employee objects such as employee object 404, each representing an employee that is part of the organization. Employee object 404 has relation 424, relation 426, and relation 428 to job profile object 406, salary object 408, and name object 410, respectively. Job profile object 406 includes job profile attributes corresponding to employee 404. Salary object 408 includes salary attributes corresponding to employee 404. Name object 410 includes name attributes corresponding to employee 404. In this way, data can be stored in a way representing the organizational structure of the company. In some embodiments, programs can access attribute data throughout the object tree by traversing the object tree along the connections between objects given by relationships, and operate on the accessed attribute data to create a meaningful report about the organization.

Figure 5:
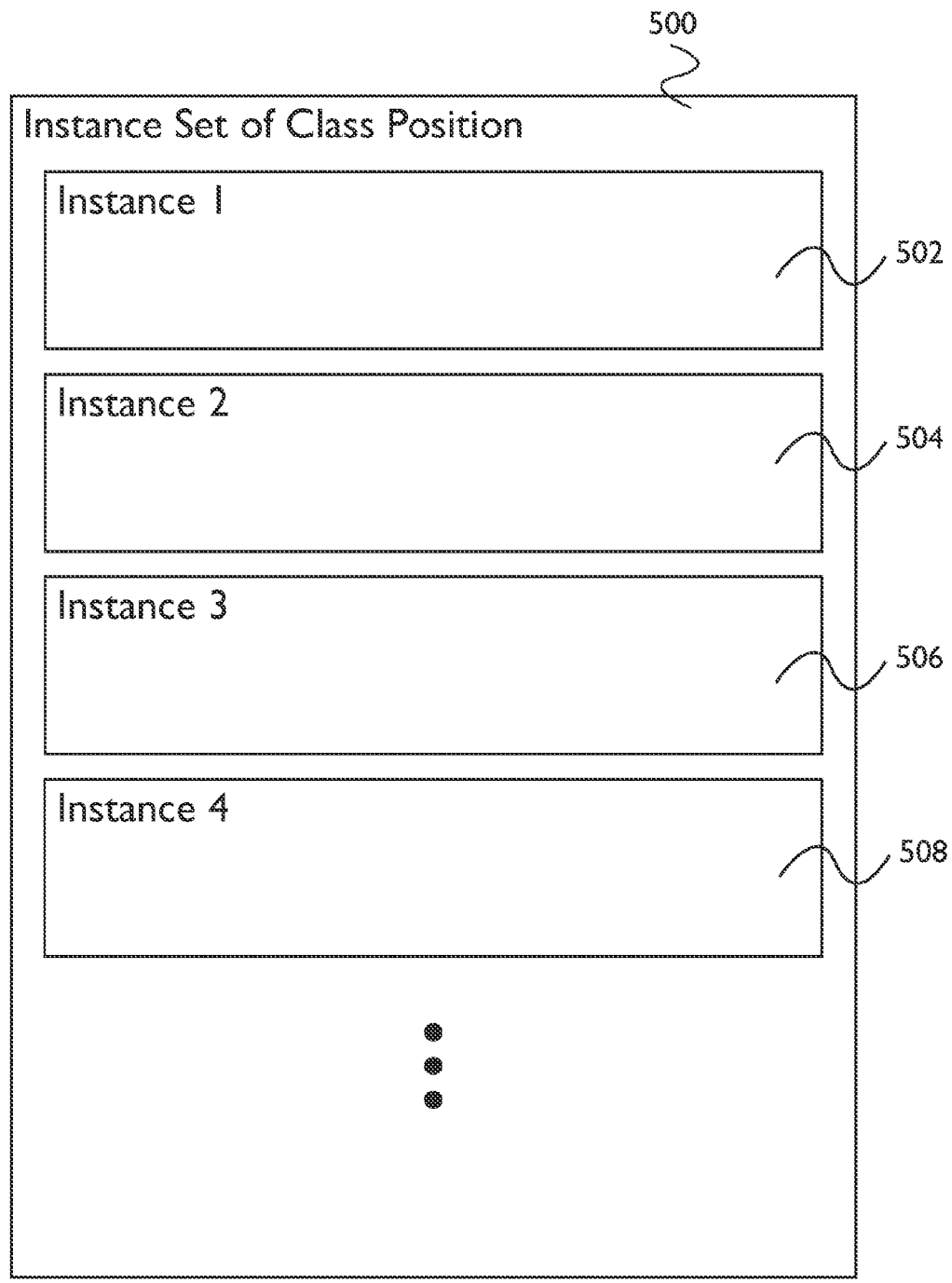
FIG. 5 is a block diagram illustrating an embodiment of a data structure.

FIG. 5 is a block diagram illustrating an embodiment of a data structure. In some embodiments, the data structure of FIG. 5 is used to group one or more object instances of a given class (e.g. a class such as class 300 of FIG. 3) into a single data element. In the example shown, instance set 500 comprises object instances 502, 504, 506, and 508 of class position. Instance sets may be passed to methods (e.g. methods such as methods 306 of FIG. 3) for processing and may be returned by methods upon their completion.

Figure 6:
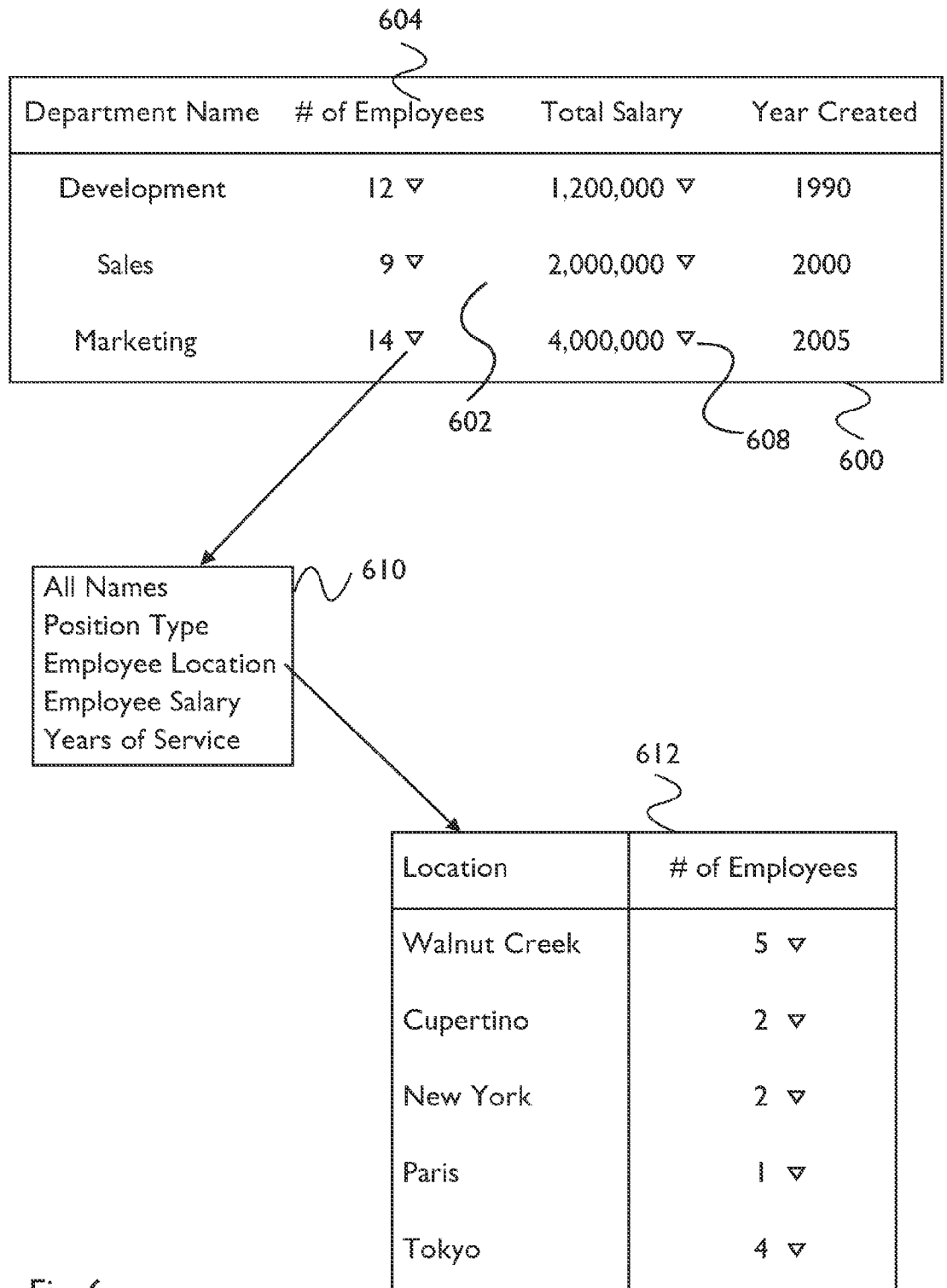
FIG. 6 is a block diagram illustrating an embodiment of a report.

FIG. 6 is a block diagram illustrating an embodiment of a report. In the example shown, report 600 summarizes data describing several departments within a business. Report 600 comprises data entries 602 and column headings 604. Data entries 602 are organized into rows and columns. Objects are assigned to rows by a method known as a report data source (RDS). In some embodiments, a subset of the methods of each class are designated as RDS's, and only those which are designated in that way can be used to assign objects to rows. In the example shown, a RDS method returns an instance set, each object in the set becoming one row in the report.

In the example shown, data entries 602 in a given column are generated by methods designated as Class Report Fields (CRF's). In some embodiments, a subset of the methods of each class are designated as CRF's, and only those which are designated in that way can be used to generate columns. In some embodiments, CRF's return either an attribute (e.g., a string, number, date, etc.) or an instance set. In the example shown, when the CRF selected for a given column returns an attribute, the data entry for the given row and column is generated by executing the CRF for the given column of the object instance for the given row and placing the attribute returned at the row and column intersection. When the CRF selected for a given column returns an instance set, the CRF for the given column of the object instance for the given row is executed and a link to the one or more object instances returned is placed at the row and column intersection. In some embodiments, a subset of the CRF methods of each class that return numbers are designated as measures. CRF's that are designated as measures can be used to summarize data from each instance of an instance set to a data value corresponding to that instance. An aggregation function is selected for the column to combine the set of numbers returned by executing the measure for each object in the instance set into the final value for the data point. In various embodiments, the aggregation function comprises a sum, average, minimum, maximum, a count, or any other appropriate aggregation function.

In the example shown, the RDS method chosen is a method of a business class that returns an instance set of objects comprised of each department in the business. The first column displays the department names, and is created by selecting a CRF of the department class that returns the department name. The column labeled "# of Employees" is created by selecting a CRF of the department class that returns an instance set of all employee objects within the department. An aggregation function is chosen for the column to count the number of instances in the returned instance set. The column thus shows the number of employees in each department. In the column labeled "Total Salary", the same CRF is selected as in the column labeled "# of Employees", to generate an instance set of all employee objects in each department. An employee class measure is chosen that returns the employee salary, and the aggregation function is chosen to be a sum, listing the total of the salaries for the employees of each department. In the column labeled "Year Department Created", a numeric CRF is chosen from the department class, returning the year the department was created. An aggregation function is not used since each department returns a single number.

In the example shown, report 600 enables dimensional data exploration. Any data entry in data entries 602 that is created from an instance set, a measure, and an aggregation function can be explored along other dimensions, in order to reveal more information about the instance set to the user. Data exploration buttons such as data exploration button 608 mark data entries that can be explored. In various embodiments, the possibility to explore data along other dimensions comprises a button, a mark, a symbol, a highlighting of the data, a font change, a color change, a surrounding of the data text (e.g., a frame box), a pop-up appearance, an auditory or haptic cue, or any other appropriate manner of signifying that the data can be explored. When the server receives indication that a user has interacted with the data exploration button, it presents the user with a submenu such as submenu 610. The submenu contains a list of dimensions upon which the instance set can be further explored. This list is created by selecting a set of CRF's of the class returned by the column CRF. These CRF's are known as dimensions, and must return instance sets. In some embodiments, a subset of the CRF methods of each class that return instance sets are designated as dimensions, and each of those which are designated in that way are used to generate a submenu for data exploration. When the user selects a dimension upon which to further explore the data, each object in the instance set executes the dimension, and the resulting data is grouped into categories. Objects with results that have been grouped into categories are grouped into instance sets. A subreport (e.g. subreport 612) is created, summarizing the categorized data returned by the dimension. Instance sets representing the groups are linked to the data points in subreport 612 in the same way as in report 600, allowing further levels of dimensional data exploration. In some embodiments, data may be categorized over two or more dimensions at once, producing a multidimensional subreport.

Figure 7:
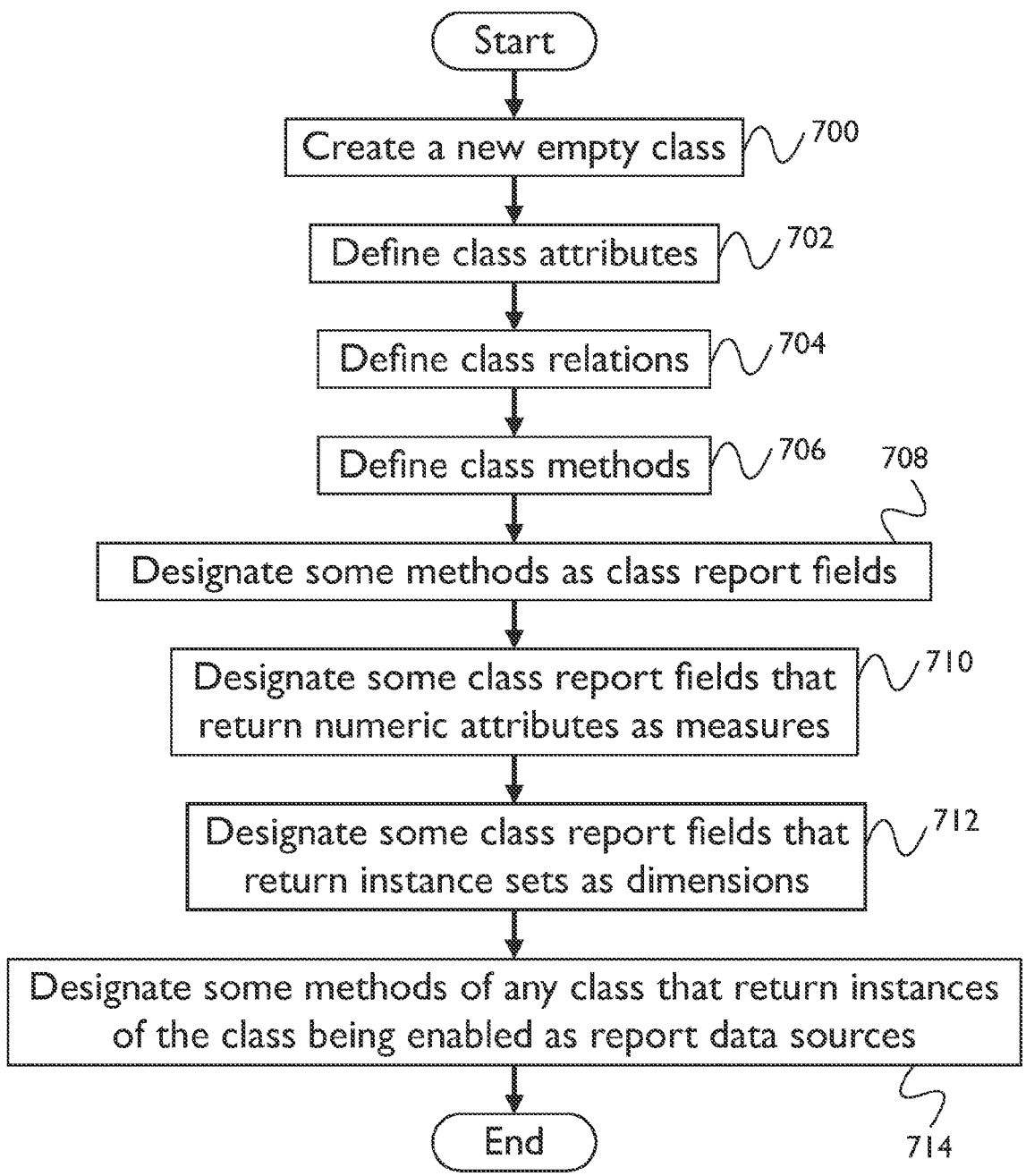
FIG. 7 is a flow diagram illustrating an embodiment of a process for creating a class and enabling it for participating in reporting and dimensional data exploration.

FIG. 7 is a flow diagram illustrating an embodiment of a process for creating a class and enabling it for participating in reporting and dimensional data exploration. In some embodiments, the process of FIG. 7 creates class 300 of FIG. 3. In the example shown, in 700, a new empty class is created. In 702, class attributes (e.g. attributes 302 of FIG. 3) are defined. In 704, class relations (e.g. relations 304 of FIG. 3) are defined. In 706, class methods (e.g. methods 306 of FIG. 3) are defined. In 708, some of the class methods are designated as CRF's. In some embodiments, a class may only participate in reporting if one or more of its methods are designated as CRF's. In 710, some of the CRF's that return numeric attributes are designated as measures. In 712, some of the CRF's that return instance sets are designated as dimensions. In some embodiments, a class may only participate in dimensional data exploration if one or more of its CRF's are designated as dimensions. In 714, methods of any class in the database system that return instances of the class being enabled are designated as RDS's. In some embodiments, a class may only participate in reporting if there are one or more methods designated as RDS's that return instances of that class.

Figure 8:
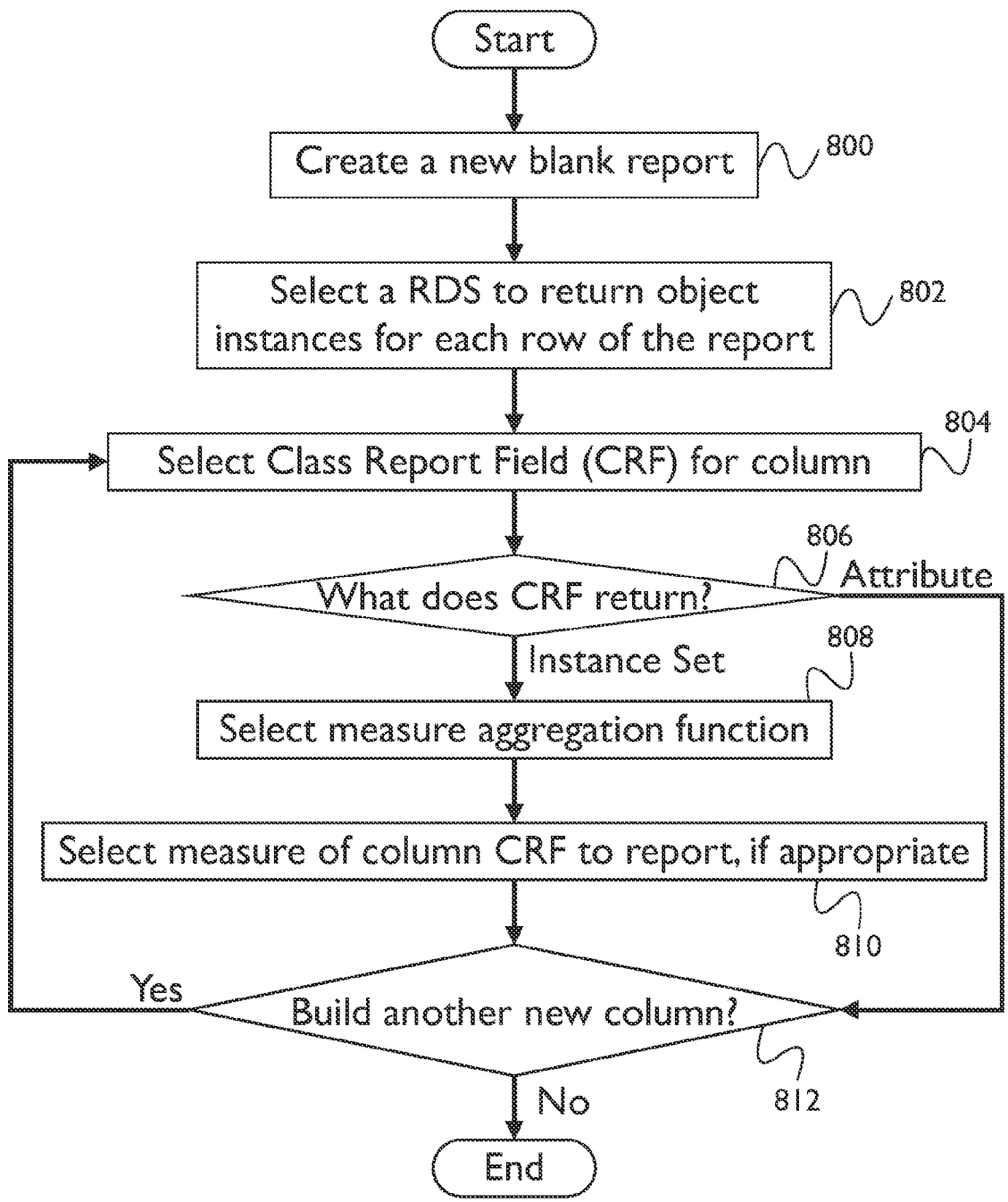
FIG. 8 is a flow diagram illustrating an embodiment of a process for creating a report.

FIG. 8 is a flow diagram illustrating an embodiment of a process for creating a report. In some embodiments, the process of FIG. 8 is used by a report creator (e.g. report creator 206 of FIG. 2) to create a report (e.g. report 600 of FIG. 6). In the example shown, in 800, a new blank report is created. The blank report is comprised of blank rows and columns. In 802, a RDS is selected to return object instances for each row of the report. When the RDS is executed, it returns a set of instances of objects of a given class. When the report is run, each object returned by the RDS will be assigned to a report row. In 804, a CRF is selected for a column. The CRF is chosen from the CRF's of the class returned by the RDS. In 806, the return of the CRF is determined. Specifically, the returned data type for the CRF is evaluated. If the CRF returns an attribute (e.g. a text string, a number, or a date), control passes to 812. If the CRF returns an instance set, control passes to 808. In 808, a measure aggregation function is selected. The aggregation function is used to combine the instances in the instance set. In some embodiments, the aggregation function comprises sum, average, minimum, maximum, counting, or any other appropriate aggregation function. In 810, a measure of the column CRF to report is selected, if appropriate. When the report is run, the measure returns a number, which is then aggregated by chosen aggregation function to produce a data entry. Some aggregation functions do not require a measure to be chosen in order to perform aggregation (e.g. counting). In 812, it is determined if another column is to be built. If another column is to be built, control passes to 804. If not, the process ends.

Figure 9:
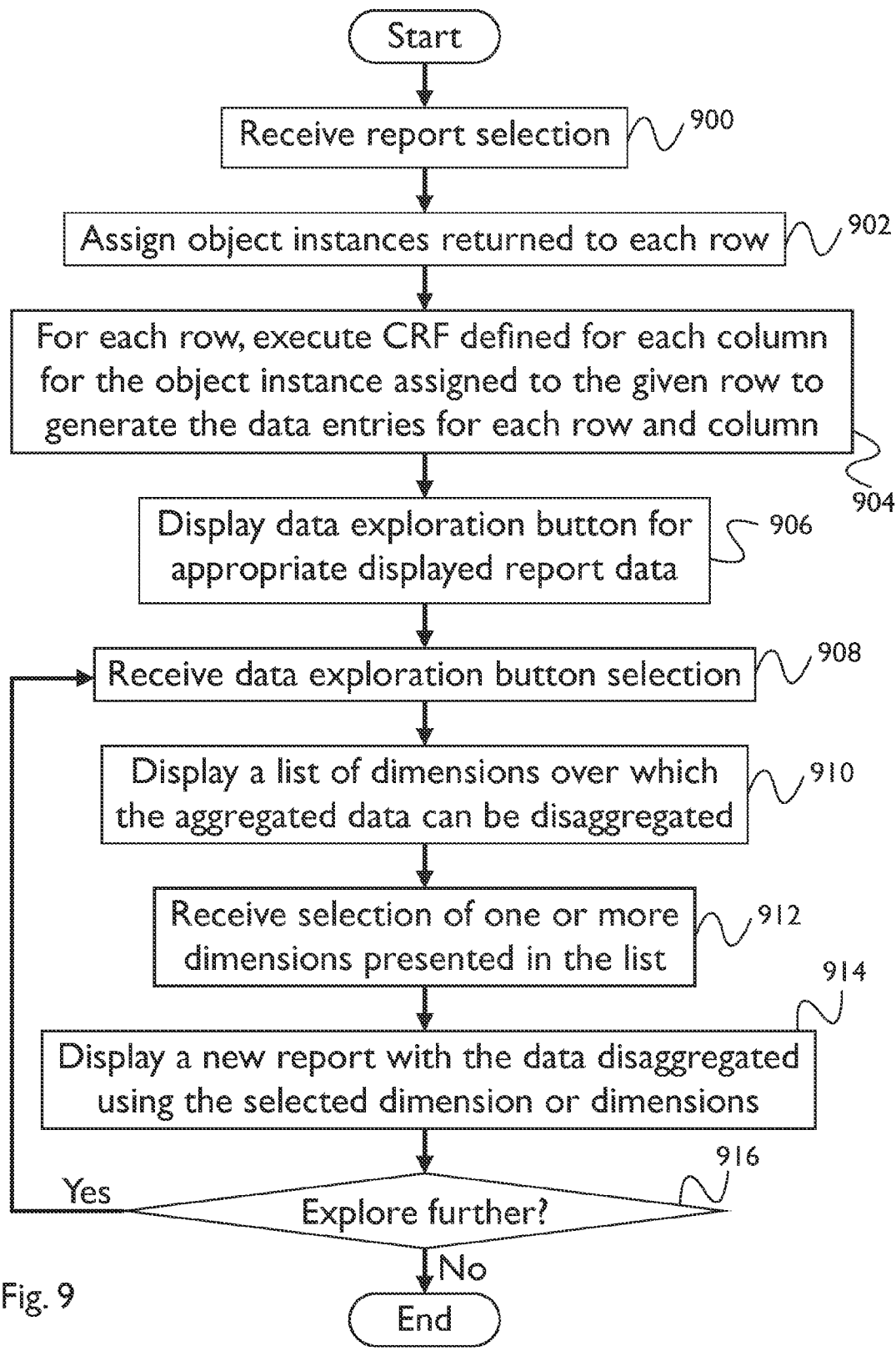
FIG. 9 is a flow diagram illustrating an embodiment of a process for running and exploring a report.

FIG. 9 is a flow diagram illustrating an embodiment of a process for running and exploring a report. In some embodiments, the process of FIG. 9 is used by a report user to view and interact with a report (e.g. report 600 of FIG. 6). In the example shown, in 900, report selection is received. In 902, object instances returned to each row are assigned. The report data source returns an instance set of objects. Each instance in the instance set is assigned to a row of the report. In 904, for each row, the CRF defined for each column for the object instance assigned to a given row is executed to generate the data entries for each row and column. Appropriate aggregation is performed for a given column. In 906, a data exploration button is displayed for appropriate displayed report data. The system displays a data exploration button (e.g. data exploration button 608 of FIG. 6) next to each data entry that has been created by aggregation and that can be explored along other dimensions. In 908, a data exploration button selection is received.

In 910, the system displays a list of dimensions over which the aggregated data in the report can be disaggregated. In various embodiments, the list contains some or all of the CRF's that are labeled as dimensions in the class of the instance set used to create the selected aggregated value. In 912, a selection of one or more of the dimensions presented in the list is received. The dimension or dimensions are executed for each object in the instance set, and the returned results are grouped into categories, with the corresponding objects that returned the results grouped into instance sets. In 914, the system displays a new report with the data disaggregated using the selected dimension or dimensions. In 916, the system presents the user the option to further explore the data in the new report. If a command to explore further is received, control passes to 908. If a command to finish exploring is received, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for reporting, comprising:
   a processor configured to:
      generating a report from a set of objects;
      determine whether a data comprises an aggregated data in the report, wherein the aggregated data comprises a set of measures that have been aggregated for each object of the set of objects, wherein the set of measures is aggregated using an aggregation function comprising one of the following: a summing function, an averaging function, a minimum function, a maximum function, or a counting function;
      in the event that the data comprises the aggregated data in the report:
         determine a list of dimensions by which the aggregated data can be disaggregated and reaggregated; and
         receive a selected dimension from the list of dimensions; and
         provide the aggregated data disaggregated and reaggregated using the selected dimension, wherein the aggregated data includes another aggregated data comprising another set of measures that have been aggregated for each object of another set of objects; and
         in the event that a different dimension is selected, provide the aggregated data disaggregated and reaggregated using the selected different dimension;
   a memory coupled to the processor and configured to provide the processor with instructions.

2. A system as in claim 1, wherein the processor is further configured to receive a request to explore the aggregate data.

3. A system as in claim 1, wherein the processor is further configured to store the aggregate data in the report with a link to the set of objects.

4. A system as in claim 1, wherein the processor is further configured to present a new report of the aggregated data disaggregated and reaggregated using the dimension from the list of dimensions.

5. A system as in claim 1, wherein the processor is further configured to build the set of objects, wherein the set of related objects is built by executing a method of a parent object.

6. A system as in claim 1, wherein a set of sets of related objects is built by executing a method of each of a set of parent objects.

7. A system as in claim 1, wherein a measure is any method of an object in the set of related objects that returns a number.

8. A system as in claim 1, wherein a dimension is any method of an object in the set of related objects that returns a set of object instances.

9. A system as in claim 1, wherein aggregated data can be disaggregated and reaggregated using two or more dimensions in a single new report.

10. A system as in claim 1, wherein the processor is further configured to build the report, wherein data in the report is aggregated from objects accessible from a parent object.

11. A system as in claim 10, wherein data in the report is organized into one or more columns defined by a report creator.

12. A system as in claim 10, wherein each object in an instance set returned by a report data source method of the parent object is assigned to a row of the report.

13. A method for reporting, comprising:
   generating a report from a set of objects;
   determining, using a processor, whether a data comprises an aggregated data in the report, wherein the aggregated data comprises a set of measures that have been aggregated for each object of the set of objects, wherein the set of measures is aggregated using an aggregation function comprising one of the following: a summing function, an averaging function, a minimum function, a maximum function, or a counting function;
   in the event that the data comprises the aggregated data in the report:
      determining a list of dimensions by which the aggregated data can be disaggregated and reaggregated; and
      receiving a selected dimension from the list of dimensions; and
      providing the aggregated data disaggregated and reaggregated using the selected dimension, wherein the aggregated data includes another aggregated data comprising another set of measures that have been aggregated for each object of another set of objects; and
      in the event that a different dimension is selected, providing the aggregated data disaggregated and reaggregated using the selected different dimension.

14. A computer program product for reporting, the computer program product being embodied in a non-transitory computer readable medium and comprising computer instructions for:

generating a report from a set of objects;

determining whether a data comprises an aggregated data in the report, wherein the aggregated data comprises a set of measures that have been aggregated for each object of the set of objects, wherein the set of measures is aggregated using an aggregation function comprising one of the following: a summing function, an averaging function, a minimum function, a maximum function, or a counting function;

in the event that the data comprises the aggregated data in the report:

determining a list of dimensions by which the aggregated data can be disaggregated and reaggregated; and receiving a selected dimension from the list of dimensions; and providing the aggregated data disaggregated and reaggregated using the selected dimension, wherein the aggregated data includes another aggregated data comprising another set of measures that have been aggregated for each object of another set of objects; and in the event that a different dimension is selected, providing the aggregated data disaggregated and reaggregated using the selected different dimension.

* * * * *